Feb. 12, 1946.  J. L. CHRISTMANN  2,394,593
AUTOMATIC SCALE
Filed April 8, 1944  9 Sheets-Sheet 1
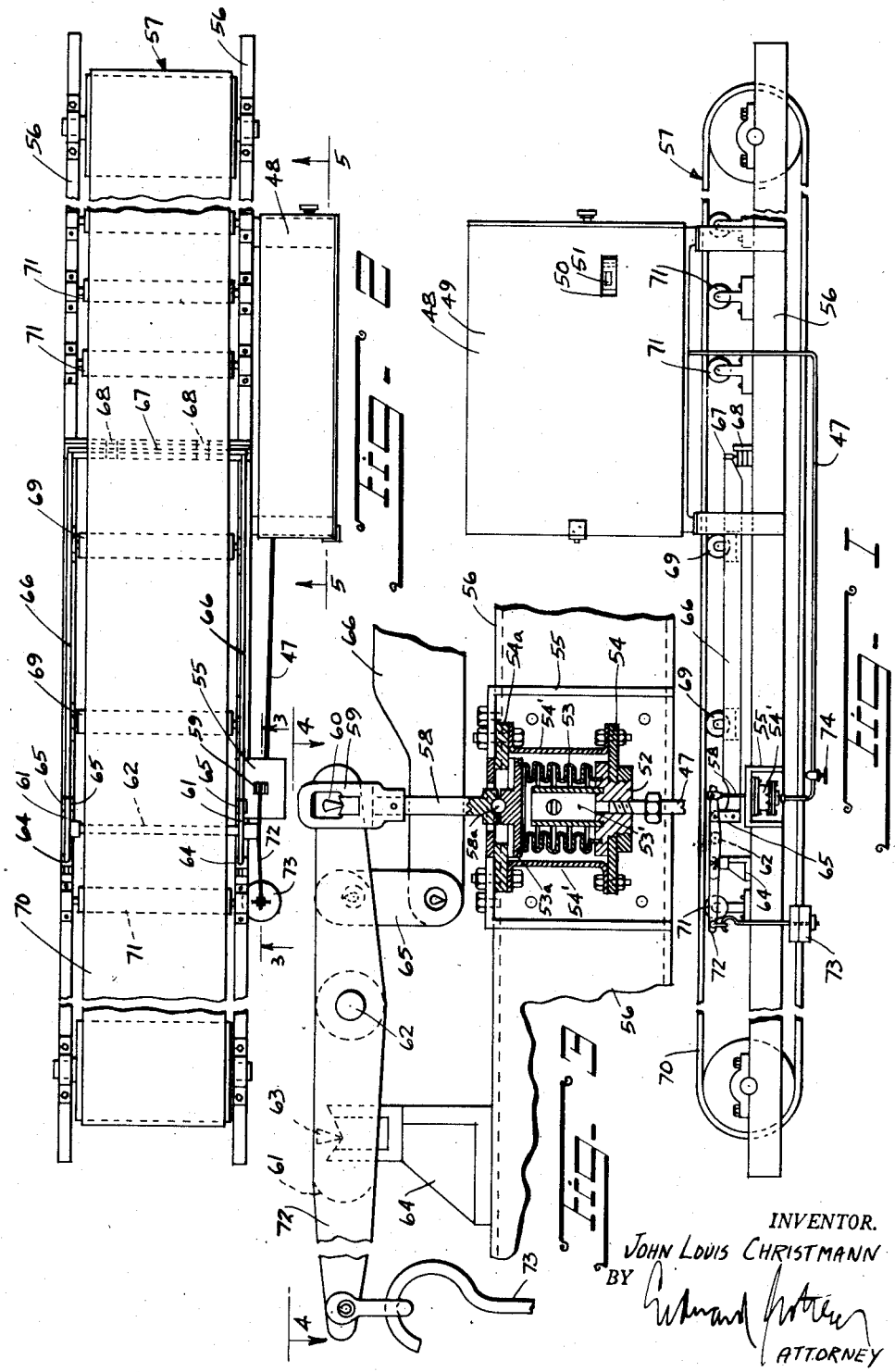
INVENTOR.
JOHN LOUIS CHRISTMANN
BY
ATTORNEY

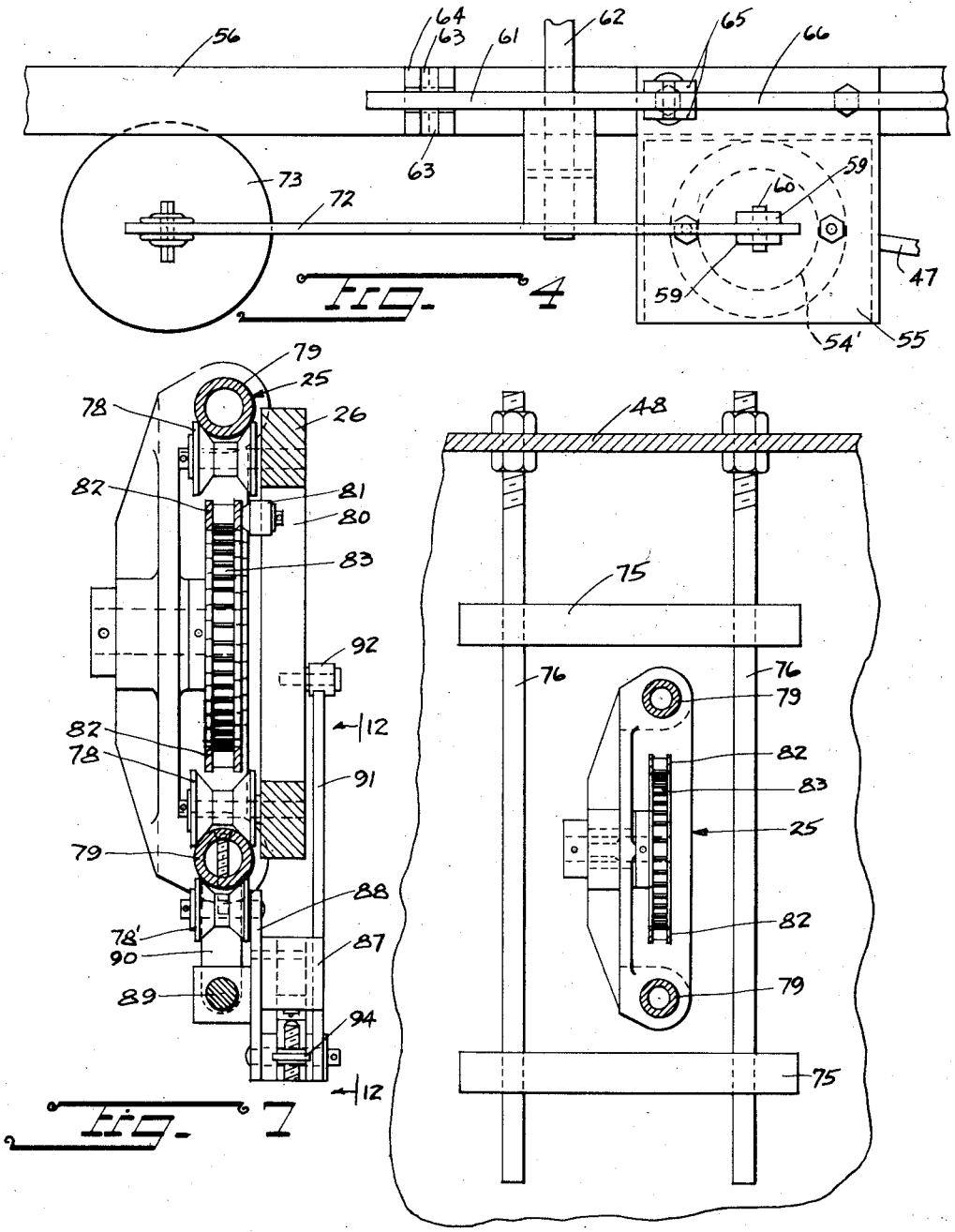

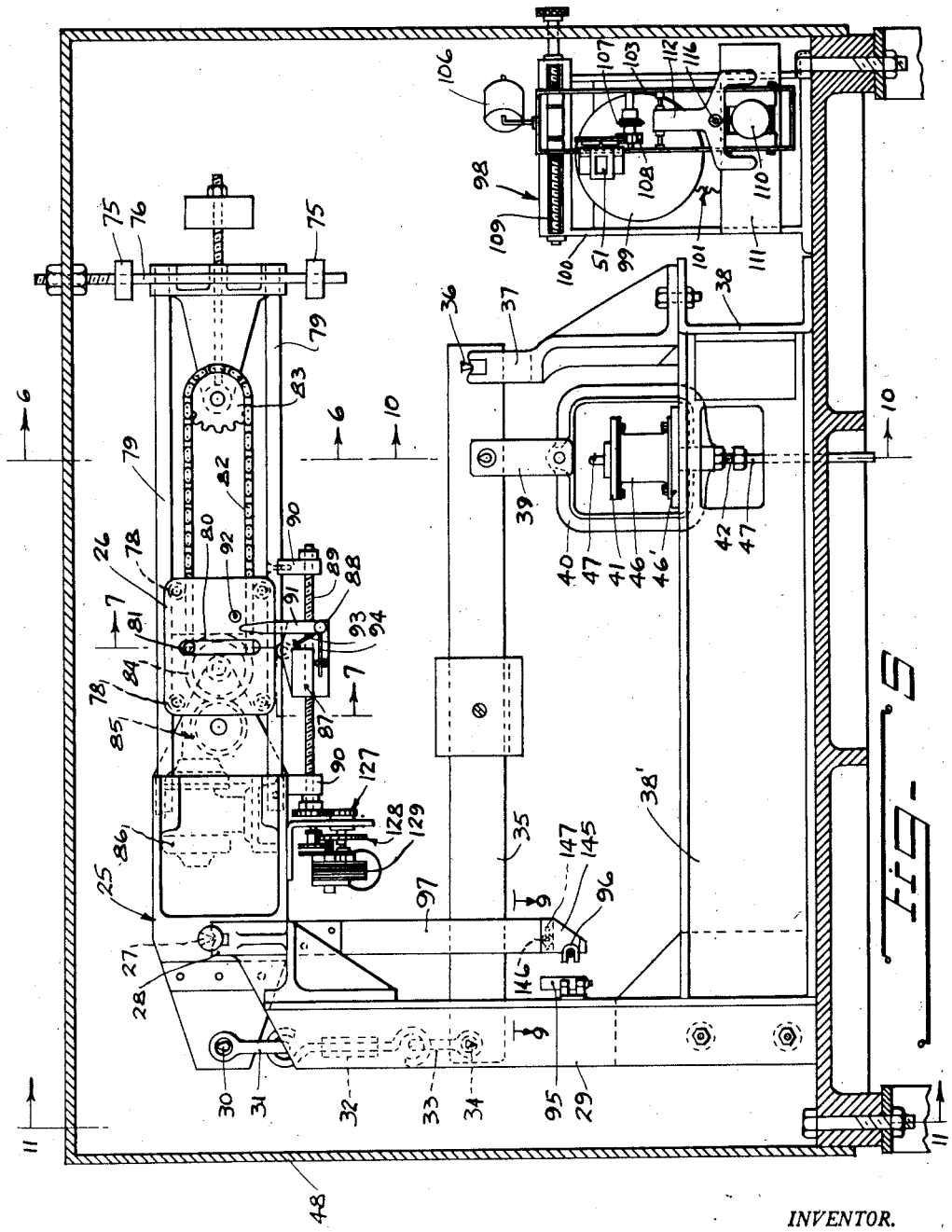

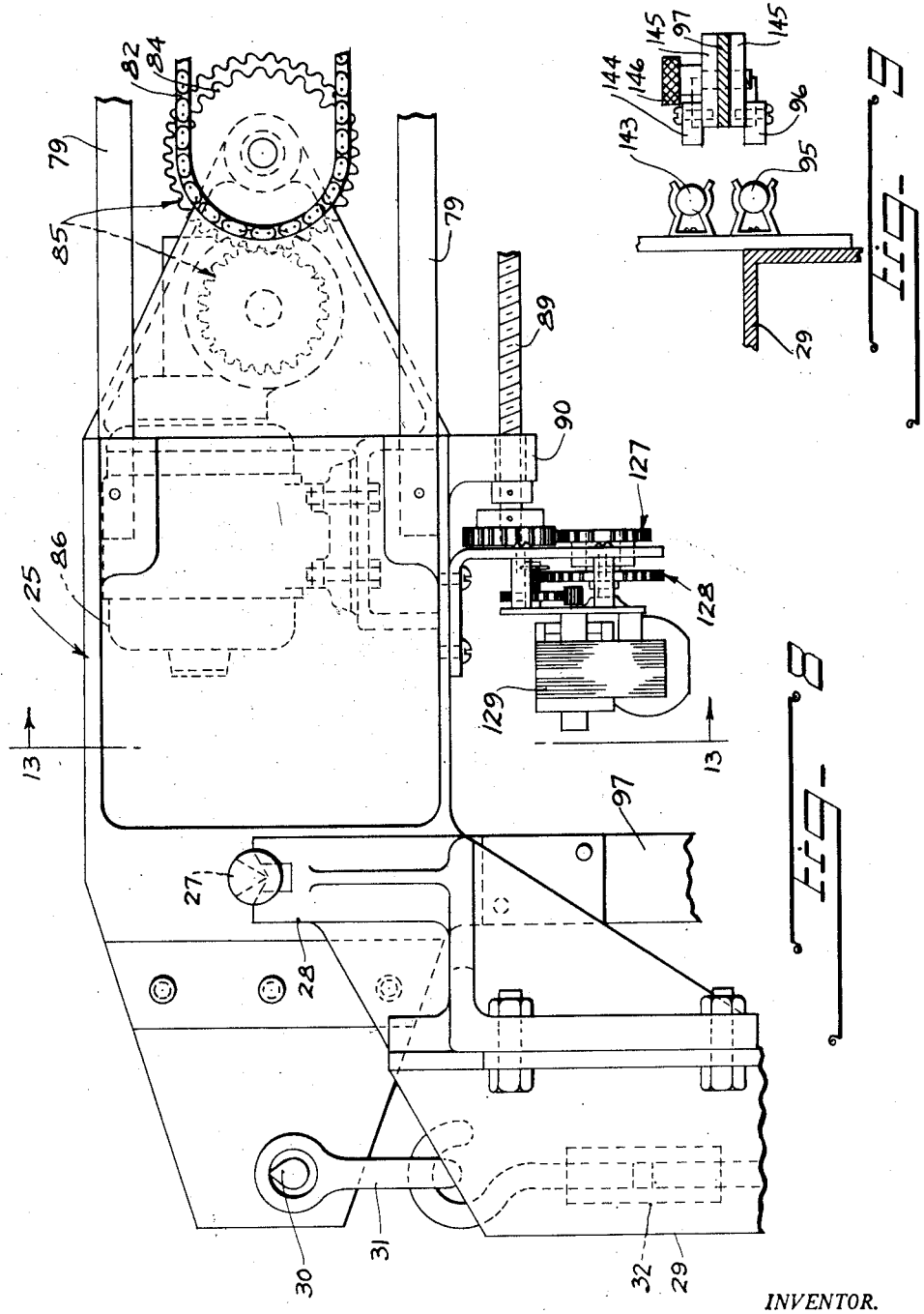

Feb. 12, 1946.    J. L. CHRISTMANN    2,394,593
AUTOMATIC SCALE
Filed April 8, 1944    9 Sheets-Sheet 5
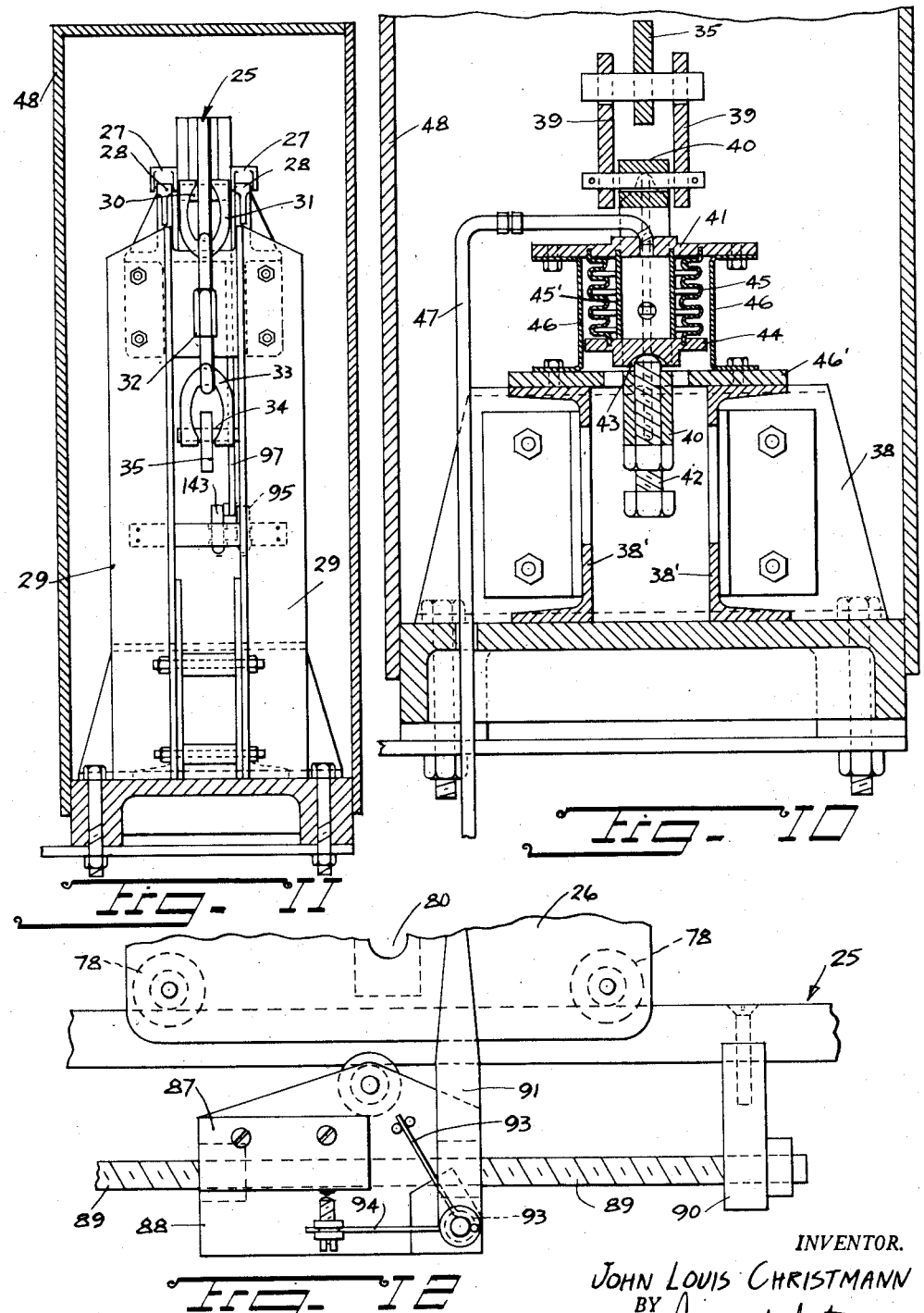

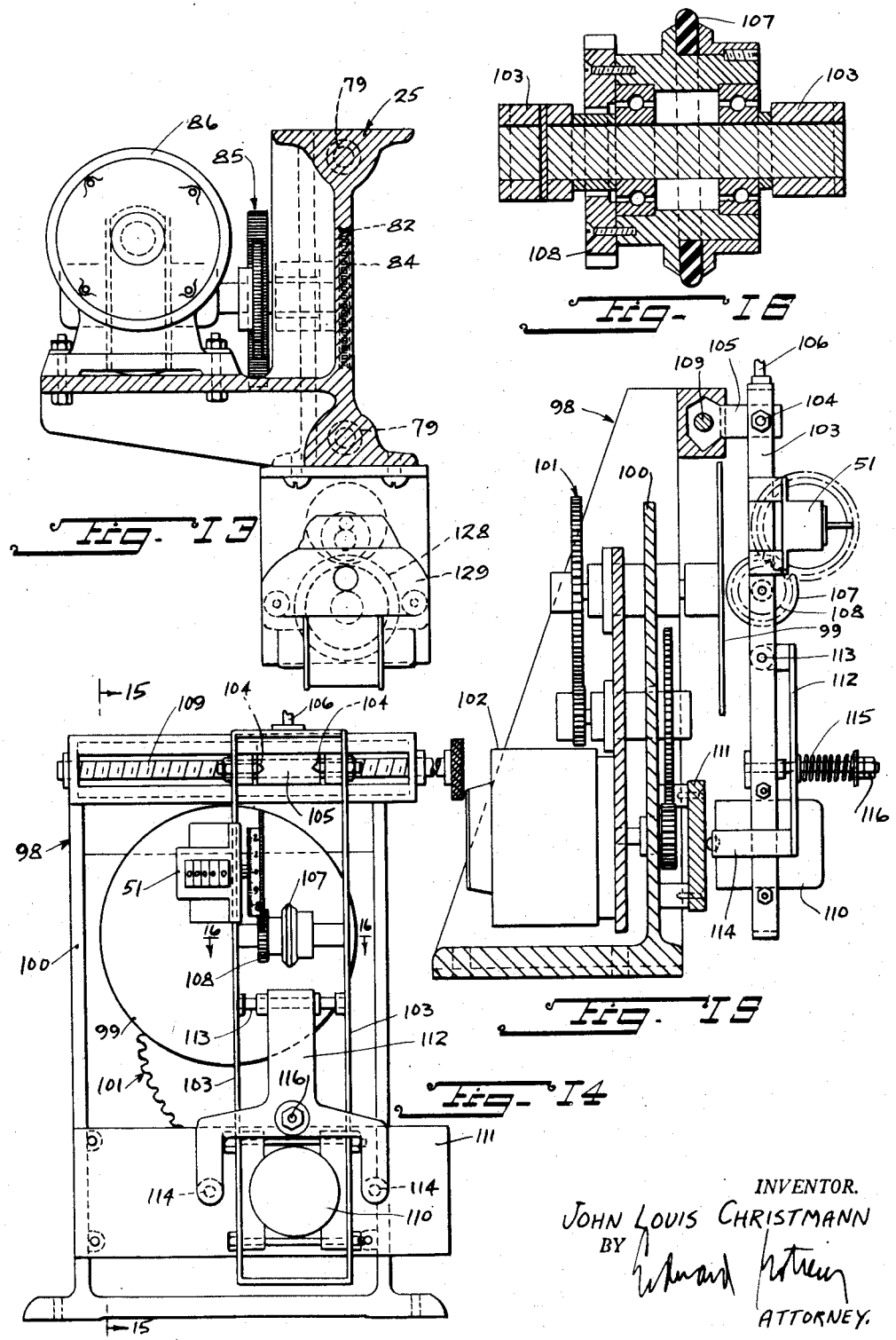

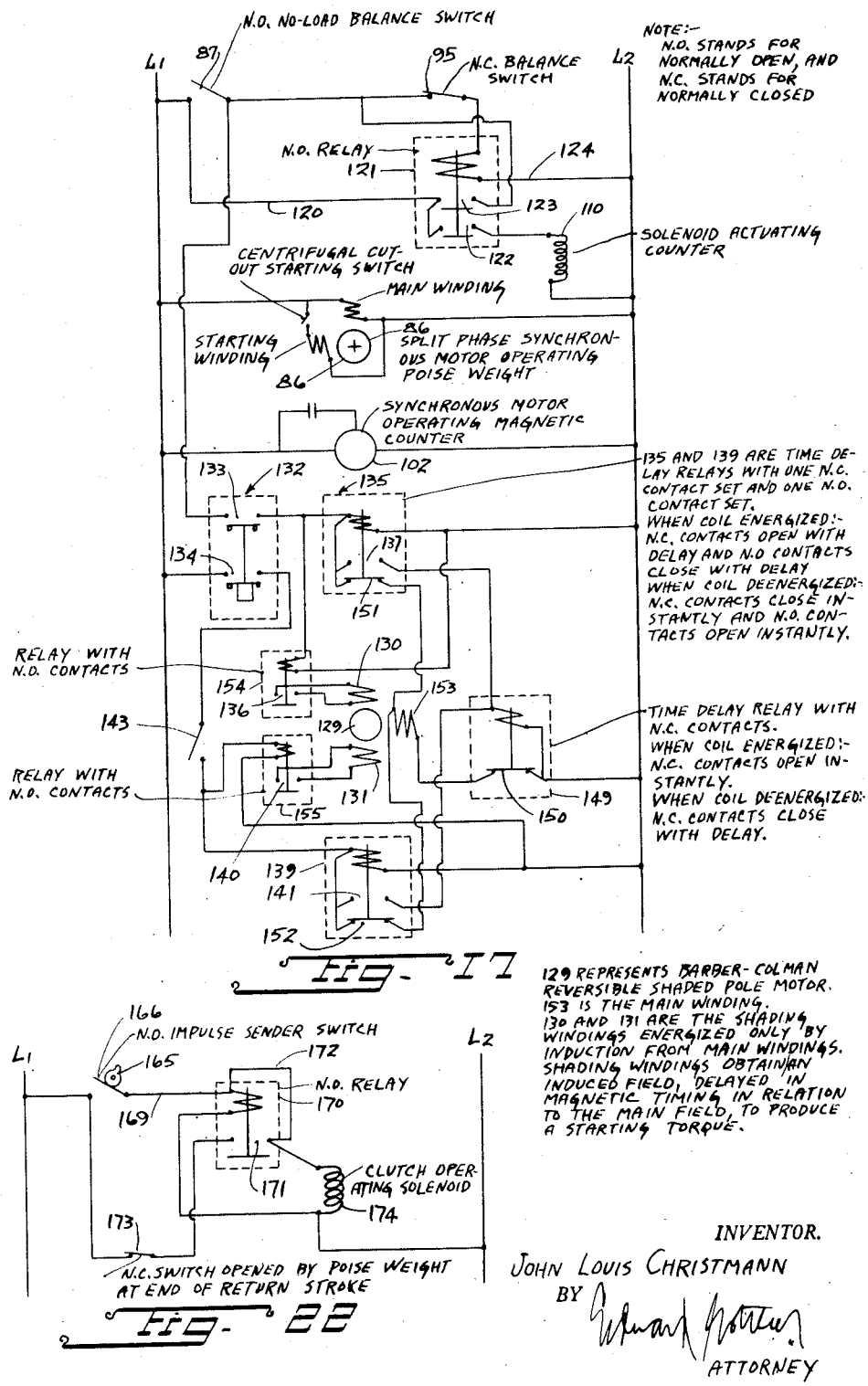

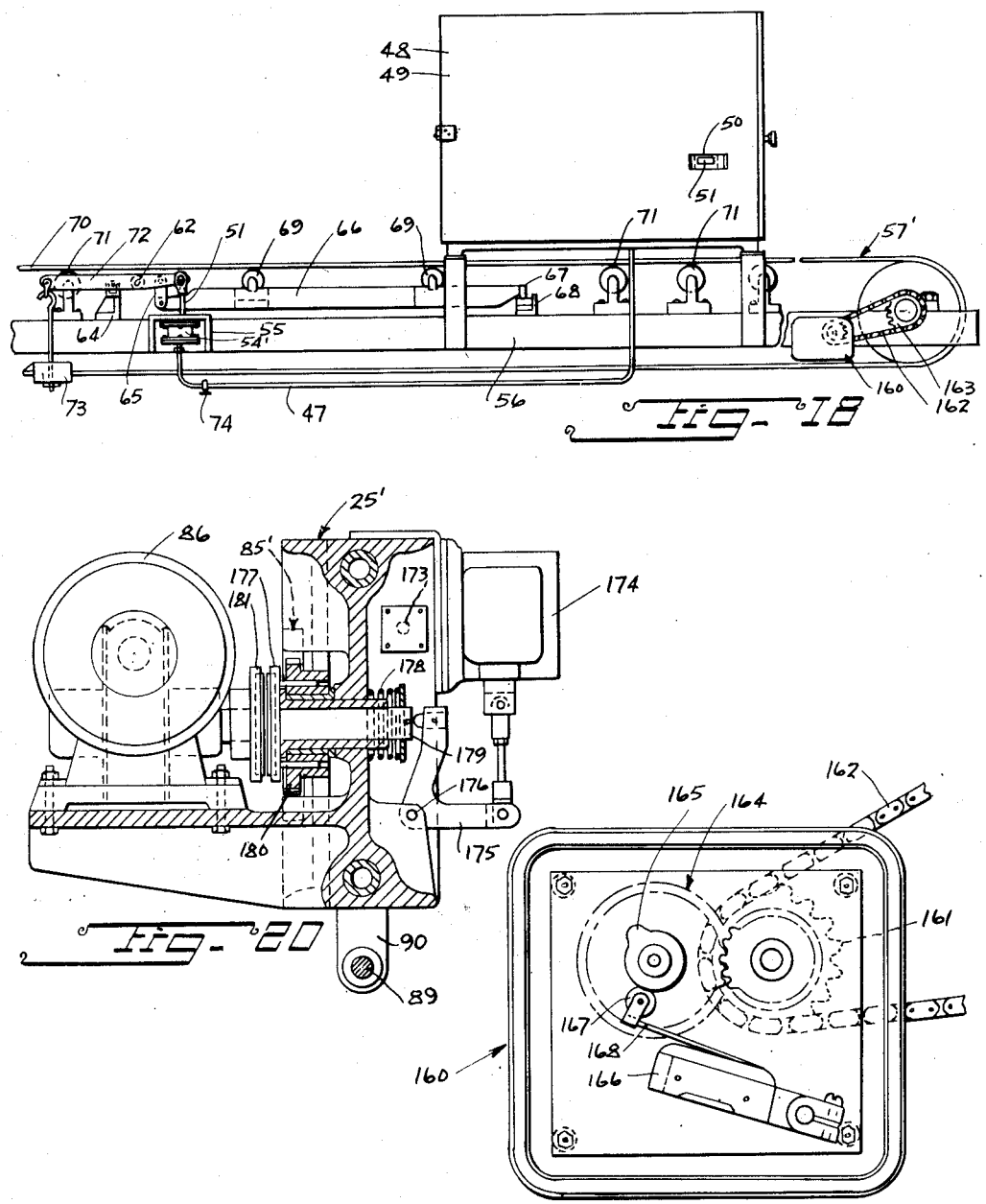

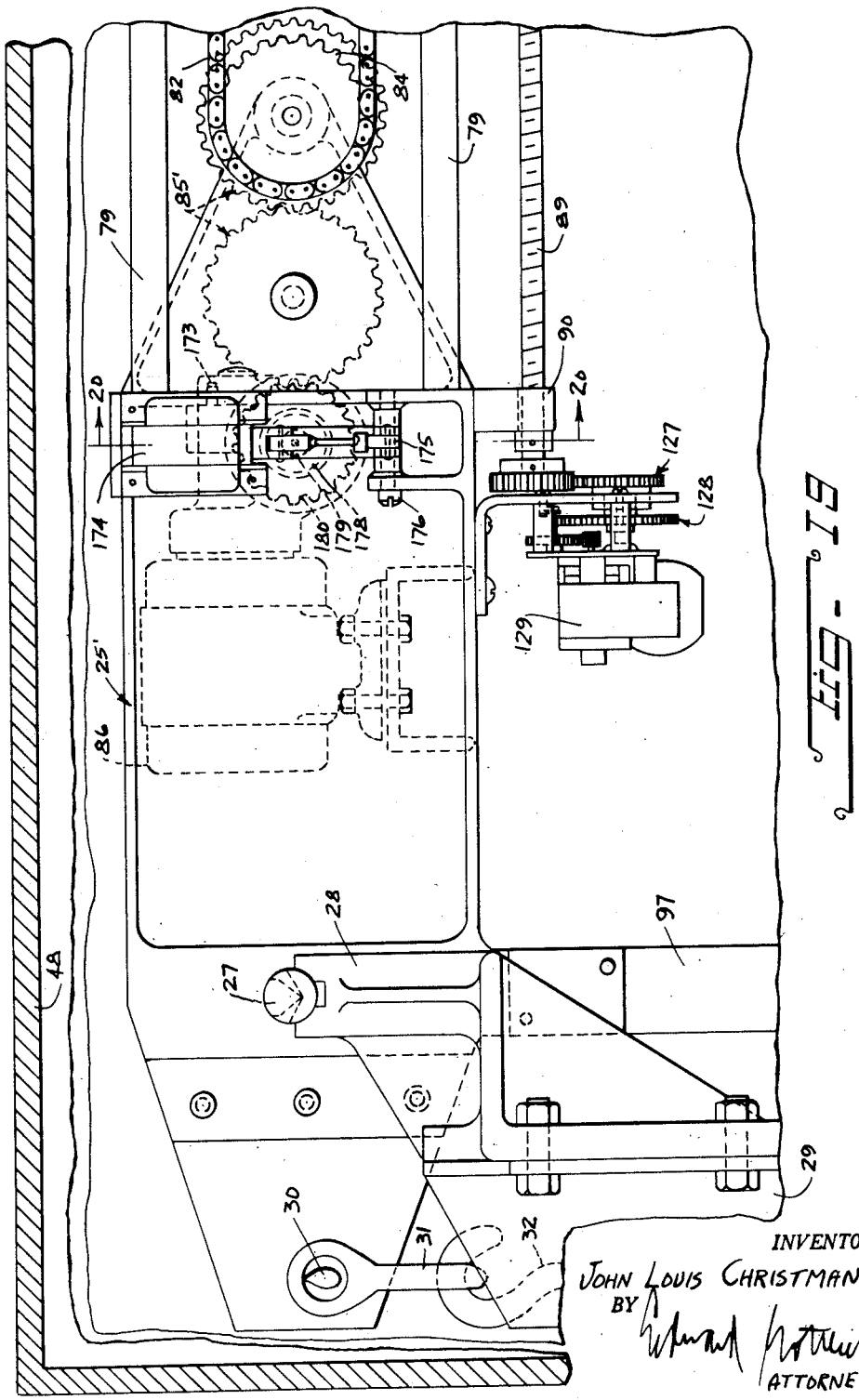

Patented Feb. 12, 1946

2,394,593

UNITED STATES PATENT OFFICE 2,394,593

AUTOMATIC SCALE

John Louis Christmann, Passaic, N. J.

Application April 8, 1944, Serial No. 530,138

19 Claims. (Cl. 265—28)

This invention relates to new and useful improvements in scales, and has more particular reference to automatic scales.

The invention also relates to automatic scales adapted to function with a new and improved hydraulic transmission.

Each new automatic scale is characterized by a beam with a movable poise weight for counterbalancing the weight to be measured. It is proposed to limit pivoting of this beam through a small amount. It is proposed to associate said poise weight with means for reciprocating same at a constant speed, one cycle on said beam for each "weight" to be measured. With this arrangement the automatic scale may be used for batch weighing or for continuous weighing, as for example the weighing of material upon a conveyor.

The invention proposes a no load balance switch arranged for operation by said poise weight in the no load position of the poise weight on the beam. A balance switch is also provided for operation by said beam in the balance position of said poise weight upon said beam counterbalancing the weight to be measured. An electromagnetic counter is calibrated to register in relation to the time of travel of said poise weight between its no load balance and balance positions. The invention also proposes an electric circuit for operating said electro-magnetic counter and including said no load balance switch for closing said circuit and for operating an electric holding relay for holding said circuit closed. Said balance switch is also included in said electric circuit for opening same.

The operation of the automatic scale as briefly described above consists, essentially, in having the electro-magnetic counter register during that increment of time in which the poise weight passes the no load balance switch and until the poise weight reaches a balance position on the beam where the beam deflects suddenly downward from its upward tilted position and causes the balance switch to operate and stop the recording operation. Since the poise weight is moving at a constant speed it is obvious that the circuit may be arranged to have the registering take place on the return stroke of the poise weight, that is, registering may start when the balance switch is operated by the poise weight reaching a balance position on the beam so that it deflects, and registration ceases when the poise weight reaches the no load balance switch.

An important feature of the new and improved automatic scale resides in the fact that it is particularly adapted for use in combination with a new hydraulic transmission system. For example, we may have a suspension for the weight or weights to be measured and said hydraulic system may be connected between said suspension and with said beam to transmit a force to said beam which is in proportion to the weight on the suspension so that when the poise weight reaches a position on the beam in which there is a balance, the beam will deflect by tending to force the hydraulic fluid back lifting ever so minutely the suspension with its weight. The important feature of this new and improved automatic scale with the hydraulic transmission resides in the fact that the hydraulic transmission is independent of ambient temperature changes. It is obvious that expansion or contraction of the hydraulic fluid will merely change the position of the suspension, but it will not interfere in any way whatsoever with the detection of a balance between the beam and the suspension.

The automatic scale with or without the hydraulic transmission may be used in conjunction with various types of suspension. For example, it may be used with a pivoted idler suspension, or with a full floating suspension. Under certain conditions of operation one or the other of these suspensions, or other types of suspensions, may be more desirable from a commercial standpoint for a particular job, even though from a theoretical point of view one may be more accurate than the other.

The new automatic scale, with or without the hydraulic transmission, may be used in combination with a conveyor unit (or for batch weighing). When used with a conveyor unit it may be used with a constant speed unit, for example, one driven by a synchronous induction motor. In this case the scale is so constructed that the poise weight will have its cycle of reciprocation synchronized with time intervals identical to the time intervals needed to move successive conveyor lengths distances equal to the weigh length over the weigh length of said conveyor unit. When the scale is used with a conveyor unit driven at a variable speed, for example, by an induction motor whose speed will be affected by the weight of material being conveyed, it is proposed to provide the conveyor unit with an impulse sender arranged so that the time interval between two impulses is equal to the time necessary for the conveyor to travel the weigh length. The impulses are associated with mechanism for controlling each cycle of reciprocation of the poise weight. It is proposed that each impulse, start a cycle of reciprocation which runs its full cycle and then stops. The next impulse starts another cycle, etc. In this way the weighing cycle is synchronized with the speed of the conveyor unit. We obtain the timing element, by the fact that the poise weight travels at a constant speed.

The invention also proposes automatic means for correctly settling the no load balance switch to its correct no load position. It is proposed to so arrange this automatic means that whenever desirable, or whenever needed, it may be set into operation, and in a very short period of time, equal to several weighing cycles, will set or reset the no load balance switch to its correct no load position.

The invention also proposes to provide the hydraulic transmission referred to above with a needle valve for dampening the surges of the fluid within said hydraulic transmission. This action will smooth out erratic changes of weight on the weigh section and so register a better average of the weight to be measured.

For further comprehension of the invention, and of the objects and advantages thereof, reference will be had to the appended claims in which the various novel features of the invention are more particularly set forth.

In the accompanying drawings forming a material part of this disclosure—

Fig. 1 is a side elevational view of an automatic scale with a hydraulic transmission constructed in accordance with this invention.

Fig. 2 is a plan view of Fig. 1.

Fig. 3 is a fragmentary enlarged vertical sectional view taken on the line 3—3 of Fig. 2.

Fig. 4 is a fragmentary enlarged detailed view of a portion of Fig. 2 showing particularly the counterweight for the weigh section.

Fig. 5 is a fragmentary enlarged vertical sectional view taken on the line 5—5 of Fig. 2.

Fig. 6 is a fragmentary enlarged vertical sectional view taken on the line 6—6 of Fig. 5.

Fig. 7 is a fragmentary enlarged vertical sectional view taken on the line 7—7 of Fig. 5.

Fig. 8 is a fragmentary enlarged detailed view of a portion of Fig. 5.

Fig. 9 is a fragmentary enlarged horizontal sectional view taken on the line 9—9 of Fig. 5.

Fig. 10 is a fragmentary enlarged vertical sectional view taken on the line 10—10 of Fig. 5.

Fig. 11 is a vertical sectional view taken on the line 11—11 of Fig. 5.

Fig. 12 is an enlarged detailed view of another portion of Fig. 5.

Fig. 13 is a fragmentary vertical sectional view taken on the line 13—13 of Fig. 8.

Fig. 14 is a fragmentary enlarged detailed view of another portion of Fig. 5.

Fig. 15 is a vertical sectional view taken on the line 15—15 of Fig. 14.

Fig. 16 is an enlarged horizontal sectional view taken on the line 16—16 of Fig. 14.

Fig. 17 is a schematic wiring diagram of the device.

Fig. 18 is a side elevational view of an automatic scale with a hydraulic transmission constructed in accordance with another form of this invention.

Fig. 19 is an enlarged fragmentary transverse sectional view of the scale cabinet shown in Fig. 18 and disclosing particularly a portion of the beam.

Fig. 20 is a fragmentary vertical sectional view taken on the line 20—20 of Fig. 19.

Fig. 21 is a fragmentary enlarged elevational view of the impulse sender shown in Fig. 18 illustrated with its cover removed.

Fig. 22 is a fragmentary schematic wiring diagram of the device shown in Figs. 18—21.

The automatic scale with the hydraulic transmission, in accordance with this invention, includes a scale beam 25 provided with a movable poise weight 26 for counterbalancing the weight to be measured. The scale beam 25 is provided with beam fulcrum pivot 27 resting on a support bracket 28 which is mounted on a vertical support 29. The butt end of the scale beam 25 is provided with a pivot 30 engaged by a clevis 31 which is connected with an adjustable tie rod 32. This adjustable tie rod 32 connects with a clevis 33 engaging the pivot 34 mounted on an intermediate lever 35. This intermediate lever 35 is provided with fulcrum pivot 36 resting upon a fulcrum support bracket 37 which is mounted on a support 38.

The intermediate lever 35 is connected with a clevis 39 which in turn is connected with a yoke 40 engaging about a bellows support consisting of a top member 41 fixedly supported by supports 46 upon a plate 46' mounted upon structural members 38'. The yoke 40 supports an adjustably mounted rod 42 engaging a socket recess 43 on the movable end member 44 of a bellows 45 mounted upon said bellows support top member 41. The hydraulic fluid for the hydraulic transmission is contained in the bellows 45. A perforated tube 45' mounted on top member 41 limits compression of said bellows 45. A tube 47 connects with the interior of the bellows 45 and extends out from a cabinet 48 used to house certain parts of the mechanism of the automatic scale. This cabinet 48 is provided with a front door 49 which may be opened when desired. The front door 49 is provided with a window opening 50 through which a counter 51 may be seen and read, as hereinafter more fully explained.

The tube 47 connects with the interior of a second bellows 53. This bellows 53 is secured upon a support member 52 mounted on a plate 54 fixedly supported by the supports 54' to a plate 54a attached upon a bracket 55. A perforated tube 53' mounted on said support member 52 limits compression of said bellows 53 by limiting motion of a movable end member 53a of said bellows 53. The hydraulic fluid is contained in the bellows 53. The bracket 55 is mounted on one of the stringers 56 of a conveyor unit 57. A rod 58 connects with the bellows 53 by resting on a ball 58a disposed in a socket recess in said movable end member 53a and extends upwards to receive with its fulcrum blocks in the bifurcated rod end 59, the pressure of the pivot 60 mounted in the long arm 72 of the main lever end casting. The short arms 61 of the main lever end castings rigidly connected together by a torsion bar 62, rest with pivots 63 on fulcrum blocks 64 mounted upon the conveyor stringers 56 and are connected by clevises 65 to the free end of the pivoted suspension frame 66. The suspension frame 66 is pivoted by end 67 engaging fulcrum supports 68 mounted across the conveyor stringers 56.

On the suspension frame 66 are mounted the suspended idlers 69 for the endless conveyor member 70. Conveyor idlers 71 are mounted on the conveyor stringers 56. The weigh length of the conveyor unit 57 is represented by the distance midway between the front conveyor idler 71 and the adjacent suspension idler 69, and the rear conveyor idler 71 and the adjacent suspension idler 69. Said long arm 72 of the main lever is rigidly connected with one of the short arms 61. A counterbalance weight 73 is mounted upon the long arm 72. The purpose of the counterbalance weight 73 is to counterbalance the dead weight of the suspension. It is pointed out that the weight to be measured upon the suspension will be transmitted indirectly into a downward thrust or force on the rod 58, which in turn will exert a compression thrust upon the hydraulic fluid within said bellows 53. This force will be transmitted through the hydraulic pipe line 47 to the bellows 45 and from here indirectly to the scale beam 25 to deflect same upwards. The weight on the weigh section is counterbalanced by shifting the poise weight 26 which must be moved from a starting position to a position along the scale beam 25 whose distance from a no load point on the beam is in direct proportion to the weight on the weigh section. A needle valve 74 is mounted within the hydraulic line 47 and is for the purpose of dampening surges of the hydraulic fluid through the hydraulic system. The needle valve 74 will produce a lag in the transmission which irons out abrupt changes of weight on the weigh section.

The scale beam 25 is limited to pivot through a small distance by stop members 75 mounted above and below the free extremity of the scale beam 25. These stop members 75 are mounted upon rods 76 mounted on and within the cabinet 48. At this point it may be advantageous to note that because of the stops 75 the scale beam 25 is not free to pivot through a great distance. Consequently, when there is a weight on the weigh section the scale beam 25 will pivot up a small distance until it strikes the top stop 75 as long as the poise weight is within a distance from the beam fulcrum where it does not counterbalance the weight on the conveyor. This action occurs irrespective of the amount of weight on the weigh section. When the poise weight 26 is moved outwards along the beam 25 it will reach a position in which it will counterbalance the weight on the weigh section and then the beam 25 will deflect downwards until it strikes the bottom stop member 75. It therefore should be clear that expansion or contraction of the hydraulic fluid used in the hydraulic transmission will merely react upon the suspension of the weigh section causing the suspended end to raise or fall an insignificant amount, but it will not influence the action of the scale beam 25 in any manner. For this reason applicant's hydraulic transmission is independent of ambient temperature changes in the hydraulic system.

At this point it may also be advantageous to note that the same balancing action on the scale beam 25 could be obtained by a mechanical transmission from the suspension to the scale beam in lieu of the hydraulic transmission.

The poise weight 26 is associated with means for reciprocating same at a constant speed arranged to reciprocate it one cycle on said scale beam 25 for each weight to be measured. More specifically, the poise weight 26 is provided with a group of guide rollers 78 slidably engaging guide rods or tracks 79 which are a part of the scale beam 25. The poise weight 26 is provided with a vertical slot 80 engaged by a pin and roller 81 mounted on an endless chain 82 which is mounted between a pair of sprockets 83 and 84 mounted on the scale beam 25 and located between the guide rods or tracks 79. The sprocket 84 is connected with a gear transmission 85 which connects with a synchronous motor 86 mounted on the scale beam 25. Rotations of the synchronous motor 86 indirectly drive the chain 82, and the pin and roller 81 on the chain operating in the vertical slot 80 reciprocates the poise weight 26.

The poise weight 26 is arranged to operate a no load balance switch in the no load position of the poise weight 26 on the scale beam 25. This no load balance switch comprises a normally open micro or other no load balance switch 87 mounted on a carriage 88 which in turn is mounted on and moved by a switch regulating screw 89. This switch regulating screw 89 is rotatively mounted in standards 90 mounted on the scale beam 25. The carriage 88 has a roller 78' engaging the bottom track 79. A switch actuating arm 91 is pivotally mounted on the carriage 88 and extends upwards along one side of the poise weight 26 and is engageable by a switch actuating roller 92 mounted on said poise weight 26. A spring 93 normally holds the switch actuating arm 91 in a vertical neutral position. The switch 87 may be made to operate when the poise weight 26 is moving outwards or inwards. In the particular design shown it will operate when the poise weight 26 moves outwards of the butt end of the scale beam 25. A flexible arm 94 is connected with the switch actuating arm 91 and engages and operates the switch 87 when the switch actuating arm 91 is moved towards the right by said roller 92. When said roller 92 moves the switch actuating arm 91 towards the left, the arm 94 merely idles away from said normally open no load switch 87.

The correct location of said no load balance switch 87 is one in which the poise weight 26 will actuate said switch 87 the instant it reaches its no load balance position. This is the position in which the beam 25 is balanced when there is no weight on the suspension. The correct setting of the no load balance switch 89 is accomplished by automatic means which will be hereinafter more fully described.

The scale beam 25 is associated with a balance switch 95 mounted on the support 29 and mechanically operated by a permanent magnet 96 mounted on an arm 97 radiating from the center line of the beam fulcrum pivot 27. When the poise weight 26 reaches a position in which it counterbalances the weight to be measured on the suspension, the scale beam 25 will deflect downwards, and the arm 97 will move towards the switch 95 operating same. The switch 95 is a normally closed switch which will be opened when the magnet 96 is moved towards it.

An electro-magnetic counter 98 is mounted within the cabinet 48 and is calibrated to give readings in relation to the time of travel of the poise weight 26 between its no load and balance positions. The electro-magnetic counter 98 is provided with an integrator table 99 which is in the form of a disc rotatively mounted on a housing 100 and extended in a vertical plane. The integrator table 99 is connected up with a train of gears 101 which connects with a synchronous motor 102. An integrator disc swing frame 103 is pivotally supported by pintles 104 mounted upon a slide 105. A staff and counterbalance weight 106 is mounted on the integrator disc swing frame 103. An integrator disc 107 is rotatively supported across the side arms of the frame 103. A counter-gear drive 108 is connected with the integrator disc 107 and connects with the counter 51 which is mounted on the integrator disc swing frame 103. The slide 105 is mounted on an adjustment screw 109 rotatively mounted across the top of the housing 100.

A solenoid 110 is mounted on the bottom portion of the integrator disc swing frame 103 and is cooperative with a stationary solenoid armature 111 mounted on the housing 100. An arm 112 is pivotally supported at its top end on a rod 113 mounted on the integrator disc swing frame 103. The arm 112 is provided with a pair of fingers 114 resting against the stationary solenoid armature 111. An expansion spring 115 is mounted on a post 116 in turn mounted on the integrator disc swing frame 103. The spring 115 acts against the arm 112 for forcing the fingers 114 of said arm, against the stationary solenoid armature 111 and so indirectly forces the integrator disc swing frame 103 outwards, in which position the integrator disc 107 is slightly out of contact with the integrator table 99. The scale may be calibrated by turning the screw 109 so as to change the radial distance of the integrator disc 107 from the center of rotation of the integrator table 99.

The electro-magnetic counter 98 operates when a current flows through the solenoid 110 for moving the integrator disc swing frame 103 towards the integrator table 99 so that the integrator disc 107 engages the table 99 and is driven by the same. The solenoid 110 is associated with an electric circuit 120 for controlling the operation of said electro-magnetic counter 98. Said circuit 120 is controlled through the medium of a normally open relay 121 which in turn is controlled by said normally open no load balance switch 87. The circuit 120 operates between the electric lines L1 and L2. Said circuit 120 includes in series the normally open contacts 122 of the relay 121 and the solenoid 110. The normally open relay 121 includes a second set of normally open contacts 123 which control a holding circuit 124 for keeping the relay 121 closed upon momentary operation of the normally open no load balance switch 87. The holding circuit 124 includes the normally closed balance switch 95 for opening same.

The motor operating the conveyor unit 57 is a reluctance type synchronous motor being connected to a three phase power line, it is not shown in Fig. 17 representing the single phase control circuit.

The automatic means for correctly setting the no load switch 87 to its correct no load position includes a spur gear transmission 127 connected with a speed reduction gear transmission 128 of a geared head shaded pole reversible motor 129. This motor and said gear transmission just mentioned are mounted upon the scale beam 25. The reversible motor 129 has a main field 153 winding and two shading coils 130 and 131 to produce the necessary torque for driving the motor clockwise or counterclockwise. (See Fig. 17).

The reversible motor 129 is controlled by a push button station 132 having two normally open sets of contacts 133 and 134. The push button contacts 133 connect the no load balance switch 87, the coil of a time delay relay 135 and the coil of relay 154 to the single phase supply lines L1 and L2. The time delay relay 135 has one set of normally closed contacts 151 and one set of normally open contacts 137; contacts 151 open and contacts 137 close with delay upon energizing of the relay coil. This particular time delay relay is known commercially as an Agastat; the time delay is obtained by pneumatic means. The relay 154 has normally open contacts 136 which close upon energizing of the relay coil a circuit over the shading coil 130 of motor 129. The contacts 151 of the time delay relay 135 connect the main field winding 153 of motor 129 to the supply line L1 and L2 over the normally closed contacts 150 of the time delay relay 149 (Agastat). This time delay relay 149 opens the contacts 150 instantly upon being energized but closes the contacts with delay when deenergized. The coil of the time delay relay 149 is controlled by the contacts 137 of the time delay relay 135.

The push button contacts 134 connect the coil of the time delay relay 139, the coil of the relay 155 over the auxiliary balance switch 143 to the single phase supply lines L1 and L2. The auxiliary balance switch 143 is mounted upon the support 29, see Figs. 5 and 9, and is closed by the action of a permanent magnet 144 mounted on the arm 97. More specifically, the permanent magnets 96 and 144 are mounted upon a bottom section 145 of the arm 97. This bottom section 145 is adjustably held in position by a clamp screw 146 working across a bifurcated upper end of the arm section 145 into which the lower end of the main portion of the arm 97 engages. Said lower end is provided with an elongated slot 147 through which a clamp screw 146 mounted on the bifurcated end of said arm section 145 passes. With this construction it is possible to set the distance between the magnets 96 and 144 and the switches 95 and 143.

The time delay relay 139 has one set of normally closed contacts 152 and one set of normally open contacts 141; contacts 152 open and contacts 141 close with delay upon energizing of the relay coil and return instantly to their normal position upon deenergizing of the relay coil. This time delay relay 139 is of the same type as relays 135 and 149. The relay 155 has normally open contacts 140 which close upon energizing of the relay coil a circuit over the shading coil 131 of the motor 129. The contacts 152 of the time delay relay 139 connect the main field winding 153 of the motor 129 to the supply lines L1 and L2 over the normally closed contacts 150 of the time delay relay 149.

The operation of the automatic means for setting the balance switch 87 to its correct no load position is as follows:

With the automatic scale operating and the conveyor unit 57 empty, the push button switch 132 is depressed during several cycles of the poise weight 26. This will cause the reversible motor 129 to operate in steps in one direction or the other for driving the switch regulating screw 89 in one direction or the other for advancing or moving back the no load balance switch 87 to its correct position. This may be understood by recognizing that if the balance is negative (on forward travel of the poise weight 26 the beam 25 will deflect downward before the poise weight 26 reaches the no load balance switch position) thereby actuating the auxiliary balance switch 143 before the no load balance switch 87 is actuated. On depressing push button switch 132, the two sets of contacts 133 and 134 will be closed. The contacts 133 being connected in series with the normally open no load balance switch 87 represents an open circuit since switch 87 has not yet been actuated and the time delay relay 135 will not be affected.

The push button contacts 134 control two circuits through the auxiliary normally open balance switch 143 which is now closed by the downward deflection of the beam 25. The coil circuit of the time delay relay 139 will be energized, but will open the set of contacts 152 with slight delay. During this delay the main field winding 153 of the reversible shaded pole motor 129 will be energized and at the same time the relay 155 will be energized; its contacts 140 will close the circuit over the shading coil 131 thereby causing the motor 129 to run in one direction during this short time delay and to drive the switch regulating screw 89 and thus to shift the no load balance switch 87 rearwards. At the end of the delay of the time delay relay 139, the contacts 152 open and the contacts 141 close, thereby closing the circuit of the coil of relay 149. The time delay relay 149 is energized, opening instantly its normally closed contacts 150, thereby opening the circuit of the main field winding 153 of the reversible motor 129. The relay 135 will therefore upon being subsequently energized by the poise weight 26 passing and operating the no load balance switch 87, not energize through its contacts section 151, the field 153 of the reversible motor 129 and therefore will not operate said motor in the opposite direction. Relay contacts 150 of relay 149 close again with slight delay when relay coil is deenergized so that the motor 129 can not be restarted until a new cycle starts.

If the balance should be positive—the no load balance switch 87 will close before the auxiliary balance switch 143 (the beam 26 deflects downwards only after the poise weight 26 passes the no load balance switch 87), the time delay relay 135 will be energized before relay 139 through the contacts 133 of the push button switch 132. During the time delay with which the relay 135 acts, the main field 153 of motor 129 will be energized and the shading coil 130 circuit being closed, the motor 129 will operate in the other direction and correspondingly drive the switch regulating screw 89 to move the no load balance switch 87 forwards. After a short delay, the time delay relay 135 will open the contacts 151, opening the circuit through the field 153 and close the circuit through the contacts 137 which energizes the time delay relay 149. The contacts 150 of the time delay relay 149 open instantly and therefore lock out the effect of the auxiliary balance switch 143 which closes as the poise weight 26 reaches a position in which the beam 25 deflects. In this manner the reversible motor 129 will be allowed to move the no load balance switch 87 by very small steps to a new position where both the no load balance switch 87 and the auxiliary balance switch 143 close simultaneously. Thereupon no further regulation takes place and the no load balance switch 87 is in its correct no load position. The push button switch 132 is now released.

The operation of the automatic scale is as follows:

The conveyor unit 57 is set into operation so that the material to be weighed continuously passes over the weigh section. The suspension of the weigh section will transmit over the main lever the weight through the hydraulic transmission system to the beam 25 of the automatic scale. Specifically, the weight or weights on the weigh section will transmit a downward thrust to the suspension frame 66. This thrust will be transmitted through the main lever 62, 72 to the bellows 53 and to the hydraulic fluid within the bellows 53. The hydraulic fluid will transmit the force through the hydraulic line 47. The needle valve 74 will dampen erratic surges and so produce a lag in the hydraulic transmission. The hydraulic fluid from the line 47 will communicate with the bellows 45, the yoke 40, etc., and then indirectly to the butt end of the scale beam 25. Therefore, the weight upon the weigh section will pivot the scale beam 25 upwards so that it strikes the top stop member 75. If any temperature changes occur in the hydraulic transmission the only effect will be a very slight elevation or lowering of the suspension of the weigh section.

The poise weight 26 is being driven at a constant speed by the synchronous motor 86. From a starting position near the butt end of the scale beam 25 it starts moving outwards along the scale beam 25. It soon reaches a position in which the roller 92 engages the switch actuating arm 91 which indirectly operates the no load switch 87, closing same momentarily. The normally open relay 121 is now actuated. A circuit is closed through the normally closed balance switch 95 and the coil of the relay 121. The relay contacts 122 and 123 now close. The circuit 120 is now closed through the solenoid 110 which actuates the counter 98. Another circuit is also closed by the contact 123 through the holding circuit 124 of the relay 121. When the solenoid 110 becomes activated the integrator disc 107 engages the rotating integrator table 99 and the counter 51 registers.

When the poise weight 26 reaches a position of balance on this scale beam 25, the scale beam 25 deflects suddenly downwards and the arm 97 moves the magnet 96 towards the normally closed balance switch 95 causing same to open. The holding circuit 124 of the relay 121 is now open and the relay contacts 122 and 123 reopen. The circuit through the solenoid 110 is broken and the spring 115 pivots the integrator disc swing frame 103 so that the integrator disc 107 moves out of contact with rotating integrator table 99 and registering of the counter 51 ceases. The poise weight 26 travels to its outermost position on the beam 25 and then travels back to its original position at the butt end of the scale beam 25. When the roller 92 passes the switch actuating arm 91 on the return stroke the no load switch 87 is not affected.

The synchronous motor 86 and the synchronous motor driving the conveyor unit 57 are related to each other so that the poise weight 25 completes one cycle in the interval of time that the conveyor unit 57 moves one weigh length. It should be noted that the present invention is independent of ambient temperature changes, since the hydraulic system is not used for transmission of deflection proportional to the weight to be measured, but only to detect a temporary balance between the weight to be measured and the reciprocating poise weight 26. The apparatus weighs the material being transported on the conveyor unit for successive weigh lengths. We weigh therefore, for example, lbs. of material per ft. of conveyor × feet of conveyor per time unit, as for example, lbs. per minute, or tons per hour. It is pointed out that the hydraulic transmission may be substituted by a mechanical transmission from the suspension to the scale beam, and the automatic scale would work just as well.

In Figs. 18–22 a modified form of the invention has been disclosed which distinguishes from the prior form in adapting the automatic scales to a conveyor unit 57' which is driven by an induction motor. Quite often it is not advisable on account of size, to drive the conveyor unit with a synchronous motor as was disclosed in the first form of the invention. Since an induction motor will not operate the conveyor at a constant speed, a rearrangement of the construction and operation of the automatic scale is required. In this form of the invention an impulse sender 160 is driven from the conveyor unit 57'. The impulse sender 160 is provided with a sprocket 161 engaged by a chain 162 which engages over a sprocket 163 driven by the conveyor unit 57'. A train of gears 164 is connected up with the sprocket 161 and drives a cam 165 which operates a normally open micro switch 166. The arrangement is such that each time the cam 165 strikes a roller 167 on a control arm 168 of the micro switch 166, the switch 166 will be closed momentarily.

The microswitch 166 is connected up in a circuit 169 which controls a normally open relay 170 having normally open contacts 171. The relay 170 is provided with a holding circuit 172 which includes in series a normally closed limit switch 173 adapted to be opened by the poise weight of the scale beam 25'. The relay contacts 171 of said relay 170 control a clutch operating solenoid 174. The solenoid 174 is mounted on the scale beam 25' and is connected up with one arm of a bell crank 175 which is pivotally mounted by a pintle 176. The other arm of the bell crank 175 controls a clutch jaw 177. A spring 178 normally urges the clutch jaw 177 into an open position. The clutch jaw 177 is mounted upon a shaft 179 provided with and driving a gear 180 connected with the train of gears 85' which drives the poise weight on the beam 25'. The clutch jaw 177 is complementary to a clutch jaw 181 driven by the synchronous motor 86. The normally closed limit switch 173 is mounted upon the beam 25' at a position in which the poise weight would engage it and open same when it reaches the end of its cycle at the butt end of the scale beam 25'.

In other respects this form of the invention is similar to that previously described and like reference numerals are used to identify like parts in each of the views.

The operation of the second form of the invention is as follows:

The impulse sender 160 is geared so that impulses are generated by the cam 165 at time intervals equal to the time required by the conveyor unit 57' to travel over consecutive weigh lengths. The impulses from the impulse sender 160 indirectly energize the solenoid 174 which closes the clutch 177, 181 by action of the bell crank lever 175. At the end of the return stroke the poise weight depresses the normally closed stop switch 173, opening same, whereby the solenoid 174 is de-energized and the clutch 177, 178 is opened by the action of the spring 178. The time for a complete cycle of the poise weight travel is selected shorter than the smallest possible time interval between impulses sent by the impulse sender 160.

The weight on the suspension transmits a force through the hydraulic system to the scale beam 25' which tilts upwards and maintains this position until the poise weight thereof reaches a position counterbalancing the weight on the suspension. For each conveyor length equal to the weigh section the impulse sender 160 sends an impulse by reason of the fact that the cam 165 closes the normally open switch 166. This indirectly operates the clutch operating solenoid 174 as before stated which closes the clutch 177, 181 so that the synchronous motor 86 is now transmitting rotations to the gear 180 and the gear train 85'. This indirectly drives the poise weight which soon reaches the no load balance switch, closing same momentarily. This indirectly operates the solenoid of the counter and registering of the counter starts as explained in the first form of the invention. When the poise weight reaches the balance position, the scale beam 25' deflects downwards and indirctly opens the normally closed balance switch which indirectly de-energizes the solenoid of the counter and recording ceases. When the poise weight reaches the butt end of its position on the scale beam, the poise weight limit switch 173 is opened, which indirectly de-energizes the solenoid 174, opening the clutch 177, 181 and the poise weight remains in this position until the next impulse. From this action it will be seen that we are adding up a succession of weights on the weigh section of the conveyor units 57'.

In other respects the operation of this form of the invention is identical to the previous form.

The main features of the invention may be reviewed as follows:

1. The hydraulic transmission does not depend on a deflection of the bellows proportional to the force exerted on them, but is used only for the transmission of a force or motion due to temporary unbalance on account of the inequality of the forces acting on the weigh section and the poise position on the beam. The hydraulic transmission is used to impart a lag in the action of the hydraulic system to dampen out abrupt surges.

2. The poise weight reciprocates at a constant speed on the beam, the motion being timed with the passage of consecutive and equal conveyor length sections over the weigh length of the suspension.

3. The beam detects the balance corresponding to the weight on the weigh length during the time of the weighing cycle, preferably on the forward stroke of the poise weight. As soon as balance is reached the beam starts deflecting downward and operates the balance switch which stops registering.

4. The distance traveled by the poise weight between a zero or no load balance position and the position where balance is reached for the load on the weigh section is proportional to this weight at the moment on the weigh length of the suspension. The time interval required by the poise weight to travel this distance is equally proportional to this weight and is used for the weight integration.

5. The scale may be used for batch weighing instead of weighing on a conveyor. In that case a vat or bin may be filled with a liquid or material to be weighed, and after completion of the filling period, an impulse may start the weighing cycle. At the end of the cycle the bin or vat is emptied. The no load switch may be reset to its correct no load position by the push button switch, since some of the matter might remain in the bin or vat from the cycle just completed. The scale is now ready for another cycle.

6. The operation of the means for obtaining automatic setting of the no load switch is based on whether downward beam deflection occurs before or after the poise weight has reached the no load balance switch position.

7. The scale is calibrated by adjusting an integrator disc relative to a constant driven integrator table.

8. The suspension of the weigh section does not necessarily have to be of the pivoted type, but may be of the full floating type, or other types.

9. The integral of the two variables; load in lbs. per ft. × conveyor speed ft. per minute etc., is represented in this invention by impulses controlling a counter. The length of each impulse is proportional to the load, the frequency of successive impulses is proportional to the conveyor speed. These impulses actuate the solenoid which controls engagement of an integrator disc against the integrator table.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit.

2. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said means for reciprocating said poise weight including means for slidably guiding the poise weight on the beam, an endless member provided with a pin and roller engaging a slot in the poise weight, and means for driving said endless member at a constant speed.

3. A scale, comprising a beam with a movable poise weight for counterbalancing the weight to be measured, means for limiting movement of said beam, means for reciprocating said poise weight at a constant speed one cycle on said beam for each weight to be measured, a no load balanced switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said means for reciprocating said poise weight including means for slidably guiding the poise weight on the beam, an endless member provided with a pin and roller engaging a slot in the poise weight, and means for driving said endless member at a constant speed, including a synchronous motor mounted on said beam.

4. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said no load balance switch being adjustably mounted on said beam.

5. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said no load balance switch being adjustably mounted on said beam, and a screw for adjusting the position of said no load balance switch along said beam.

6. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said no load balance switch being adjustably mounted on said beam, and a screw for adjusting the position of said no load balance switch along said beam, and a reversible motor for driving said screw in one direction or the other.

7. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, said balance switch including a stationarily mounted switch, an arm radial of the center line of the beam fulcrum and provided with an element for operating said balance switch upon downward deflection of said beam.

8. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance portion, an electric holding relay, an electric circuit for operating said electro-magnetic counter and including said no load balance switch for closing said circuit and said relay for holding said circuit closed and said balance switch for opening said circuit, a suspension for the weight to be measured, and a hydraulic transmission from said suspension to said beam.

9. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, and an electric circuit for operating said electro-magnetic counter and including said no load balance switch for closing said circuit and said relay for holding said circuit closed and said balance switch for opening said circuit, a suspension for the weight to be measured, a hydraulic transmission from said suspension to said beam, and a needle valve controlling the hydraulic fluid of said hydraulic transmission for dampening the surges of the fluid thereof.

10. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension for the weight to be measured, and a hydraulic transmission from said suspension to said beam, and including a hydraulic bellow for receiving the force of the weight on said suspension, and a hydraulic bellow for delivering the force received by said first-named bellows to said beam.

11. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension for the weight to be measured, and a hydraulic transmission from said suspension to said beam, and including a hydraulic bellow for receiving the force of the weight on said suspension, and a hydraulic bellow for delivering the force received by said first-named bellows to said beam, said bellows being connected with a pipe line provided with a needle valve, said bellows are not used to transmit a deflection proportional to the forces acting upon them but only to detect a temporary balance between the forces acting on the bellows.

12. A scale comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension having a weigh length, a conveyor unit conveying weights to be measured and engaging over said suspension, means for driving said conveyor unit at a constant speed, and each cycle of reciprocation of said poise weight being synchronized with time intervals to move successive conveyor lengths equal to said weigh length over said weigh length.

13. A scale, comprising a beam with a movable poise weight for counterbalancing the weight to be measured, means for limiting movement of said beam, means for reciprocating said poise weight at a constant speed one cycle on said beams for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension having a weigh length, a conveyor unit conveying weights to be measured and engaging over said suspension, means for driving said conveyor unit at a constant speed, and each cycle of reciprocation of said poise weight being synchronized with time intervals to move successive conveyor lengths equal to said weigh length over said weigh length, and synchronous motors for controlling the constant speeds of said conveyor unit and of said poise weight.

14. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, and automatic means for correctly setting said no load balance switch to its correct position.

15. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, comprising means for moving back said no load switch if deflection of said beam downwards occurs before the poise weight reaches said no load switch with no load on the beam, and means for advancing said no load switch if deflection of said beam occurs after the poise weight reaches said no load switch with no load on the beam.

16. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, and automatic means for correctly setting said no load balance switch to its correct position, including a push button station having two sets of contacts, a reversible balancing motor having a main field winding and two shading coils to produce the necessary torque for driving the motor clockwise or counterclockwise, and means for moving said no load balance switch controlled by said motor, an auxiliary balance switch, a group of relays for controlling said main field winding and one of said shading coils and controlled by one set of said contacts, other group of relays controlled by the other set of said contacts and including in series said auxiliary balance switch and controlling said main field winding and the other of said shading coils, and a relay for neutralizing one or the other of said groups of relays depending upon which of said prior two groups of relays operates first.

17. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension having a weigh length, a conveyor unit traveling over said suspension, an impulse sender connected with said conveyor unit for sending impulses the time interval between two of said impulses being equal to the time necessary for said conveyor to travel said weigh length, and electromagnetic means controlled by said impulse sender and controlling said means for reciprocating said poise weight for producing one cycle of reciprocation for each impulse.

18. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension having a weigh length, a conveyor unit traveling over said suspension, an impulse sender connected with said conveyor unit for sending impulses the time interval between two of said impulses being equal to the time necessary for said conveyor to travel said weigh length, and electro-magnetic means controlled by said impulse sender and controlling said means for reciprocating said poise weight for producing one cycle of reciprocation for each impulse, said impulse sender comprising a switch, a cam for operating said switch, and a drive from said conveyor for operating said cam.

19. A scale, comprising a beam with a movable poise weight for counterbalancing the weight to be measured, means for limiting movement of said beam, means for reciprocating said poise weight at a constant speed one cycle on said beam for each weight to be measured, a no load balance switch for operation by said poise weight in the no load position of the poise weight on said beam, a balance switch for operation by said beam in the balance position of said poise weight on said beam counterbalancing the weight to be measured, an electro-magnetic counter calibrated in relation to the time of travel of said poise weight between its no load balance and balance position, an electric holding relay, an electric circuit for operating said electro-magnetic counter and including said no load balance switch for closing said circuit and said relay for holding said circuit closed and said balance switch for opening said circuit, a suspension having a weigh length, a conveyor unit traveling over said suspension, an impulse sender connected with said conveyor unit for sending impulses the time interval between two of said impulses being equal to the time necessary for said conveyor to travel said weigh length, and electro-magnetic means controlled by said impulse sender and controlling said means for reciprocating said poise weight for producing one cycle of reciprocation for each impulse, comprising a synchronous motor, a drive from said synchronous motor for driving said poise weight and including a solenoid operated clutch, a relay for maintaining a current through the solenoid of said clutch, said impulse sender operating said relay, and a limit switch engageable by said poise weight for opening the holding circuit of said relay to cause de-energization of said solenoid.

JOHN LOUIS CHRISTMANN.